March 24, 1970 B. SCHWARTZ 3,502,520

PROCESS OF MAKING PATTERNED UNITARY SOLID BODIES FROM FINELY DIVIDED DISCRETE PARTICLES

Filed Dec. 30, 1965 2 Sheets-Sheet 1

INVENTOR
Bernard Schwartz

BY Littlepage + Quaintance

ATTORNEYS

INVENTOR
Bernard Schwartz

BY Littlepage & Quaintance

ATTORNEYS 3,502,520
Patented Mar. 24, 1970

3,502,520

PROCESS OF MAKING PATTERNED UNITARY SOLID BODIES FROM FINELY DIVIDED DISCRETE PARTICLES

Bernard Schwartz, Poughkeepsie, N.Y., assignor to International Business Machines Corporation, Armonk, N.Y., a corporation of New York Filed Dec. 30, 1965, Ser. No. 527,408
Int. Cl. C23f *1/00;* C04b *35/64;* G03c *5/00*
U.S. Cl. 156—6 13 Claims

ABSTRACT OF THE DISCLOSURE

A unitary body is formed in a selected pattern by mixing suitable particles with a binder and a photodevelopable medium, exposing the mixture to radiation to sensitize the photodevelopable medium, which is differentiated from the unexposed medium upon development. The soluble material is removed by washing, leaving insoluble material in the form of the selected pattern. This material is sintered to remove the binder and form a unitized mass from the particles. A plurality of layers of the "green" material before sintering may be superimposed with conductors between them, and the material then sintered to form a unitized mass with conductor embedded therein.

This invention relates to a novel method for making patterned unitary solid bodies from finely divided particles so as to produce a patterned article possessing exceptional resolution and close tolerances; and, more particularly, to a novel process utilizing a combination of photoforming and firing.

In visual and auditory communication, in "remote control" and in information storage and retrival and the like very high speed is essential and speeds approaching the speed of light are desirable. This need for high speed, and often concomitant needs for saving of weight, and space, has led to the so-called microelectronic industry and its associates microminiaturization of components.

It is apparent that optimum smallness in components and the corresponding increasing in performance speed requires the highest possible degree of resolution and extremely close tolerances.

In many instances components of microelectronic devices such as resistors, insulators, capacitors, integrated microminiature metallic circuits, ferrite and other magnetic arrays, and the like, are most advantageously fabricated from discrete particles which are later fired or sintered to form unitary fabricated articles. Often it is necessary to develop patterns in, or from, these sintered or fired and unitized composites. Yet such articles, especially when they are thin, customarily are very brittle, or friable, so that it is difficult, if not impossible, to mechanically stamp, or cut, desired patterns from the fired or sintered, or even the unfired, composite or to make small holes therein. Moreover, the desired patterns customarily are too small dimensioned to permit their being cast in conventional molds. It is possible, of course, to etch patterns in the fired or sintered composites by known techniques but such patterns, or mosaic, often are difficult to obtain with desirable small dimensions and with the required resolution and close tolerances. For example, it is difficult and very time consuming to successfully etch through a mask, or a resist, to provide a patterned article of sufficiently small dimensions containing parts, or elements, in sufficiently close proximity to one another and with the desired resolution. In addition it is difficult and very time consuming to provide etching masks which have small enough openings to provide small dimensioned patterned articles. Also, it is not possible to etch through a mask, or stencil, into a substrate to any significant depth without etching transversally under the mask thereby placing limitations on the desired resolution of a patterned article or mosaic, and on desired close tolerances therein. Furthermore, by such methods it is not possible to control the depth or the uniformity of the size of holes etched in a substrate.

It is known to use temporary, or transitory, binders in the fabrication of unpatterned "green" ceramics, to cut, or stamp, articles therefrom, and to fire such articles to drive off the temporary binder and to unite them. The exacting resolution, close tolerances, and complex configurations most advantageously used in microelectronic are not obtainable by such a process.

It is a principal object of this invention to overcome the problems set out above and related problems in the production of microminiature patterned unitized articles from finely divided discrete particles.

It is a special object of this invention to obtain rigid, self-supporting fired and unitized solid articles in desired small dimensioned patterns.

It is another special object of this invention to produce unitary laminated articles contained buried, or embedded, patterns, such as desired conductors, provided with access holes to these patterns having desired small size and with close tolerances.

It is yet another special object of this invention to provide complicated unitized patterned small dimensioned articles with a resolution obtainable only with beams of electromagnetic energy or the like.

It is still a further important object of this invention to obtain the unitized articles of this invention with less cost and effort than has heretofore been required in the production of the most nearly analogous known articles.

The foregoing and other objects, features and advantages of the invention will be apparent from the following more particular description of preferred embodiments of the invention.

Broadly considered, the objectives of the invention are obtained by using a combination of photoforming and firing in the production of unitized patterned articles from fireable finely divided particles in which a photosensitized temporary binder is used in the obtaining of the desired pattern and, after the pattern is obtained, firing the patterned article to unitize it. More particularly, the invention relates to the production of articles in a desired pattern such as mentioned above, from finely divided fireable discrete particles by forming a fluid and flowable mass of such particles in a photo-developable, or photosensitized, liquid binder medium, casting or otherwise forming a body from said fluid mass having desired dimensions, advantageously drying the formed body, selectively photo-exposing a part of the formed body to provide exposed and unexposed regions therein of a desired configuration, removing either the exposed or the unexposed regions and the particles contained therein in a known way, as with a suitable solvent, to form, or develop, a desired patterned body from the formed body, and firing the patterned body at the firing temperatures for the discrete particles to volatilize off the binder and unitize the discrete particles into a patterned article of the desired configuration.

In a preferred practice of the invention, the fluid mass or "slip," is cast as very thin films, usually in the form of sheets which facilitates the drying of the films without the development of pin holes. Where thicker films are desired, or embedded conductor, or the like, are desired the formed films, preferably after they are dried, may be striped from the substrate upon which they are formed and laminated in a known way by the application of appropriate heat and/or pressure before the patterned body is unitized by firing. The lamination technique is especially advantageous, as will appear below, when embedded, or buried, circuits or the like, are desired, especially those which advantageously are provided with access holes from the surface of the formed body.

Known photo-forming processes are used in this invention and known means of photo-exposing are used such as any type of electro-magnetic energy including visible and invisible light, electron beam and the like. One must be careful, of course, to see that the binder remaining after the pattern is developed in the formed body has a volatilization temperature below the firing or sintering temperatures for the particulate material used. For example, when forming patterned articles from ceramic or magnetic particulate materials commercially available polyvinyl alcohol resin binders, sensitized with an ammonium, sodium, or potassium bichromate may be used. Such a binder has the advantage of being soluble or dispersible in water. Portions of a formed body of such a material can be exposed in a desired pattern to harden the binder, render it insoluble in water, and outline the desired pattern. In this way, the unexposed film and the particulate contained therein may be easily washed away in water and then the hardened binder remaining can be vaporized off and the developed patterned material unitized into the desired article by subjecting it to firing temperatures.

It will be apparent the same techniques may be used when undeveloped binders are used which are soluble in organic solvents before being developed and are rendered insoluble in such solvents after being developed.

Also, as is well known, in the photo-forming arts, one may use the reverse technique, i.e., the exposed regions may be rendered soluble in a selective solvent which is not a solvent for the unexposed regions. For instance, where a resin binder is used it may be depolymerized, and rendered more soluble, instead of being polymerized and made less soluble.

Instead of using a pattern a controlled ray of electro-magnetic energy such as an electron beam, or a beam of coherent light, may be used to outline the desired pattern and the exposed, or unexposed, regions removed in a selective solvent. For instance, if a self-supporting dielectric for a printed circuit were desired, a "printed circuit generator" could be used as a source of moving light to outline the desired pattern in a formed body using an appropriate binder.

In general, however, where a very large number of patterned articles of the same configuration are needed, it is preferable to expose the formed body through a pattern, or stencil, for the pattern, once made, can be used repeatedly. The formation of the pattern in desired small dimensions involves no real problems for a pattern of the desired configuration may be developed in the necessary relatively large size and thereafter reduced to a desired small size by known photo-reducing techniques. For instance, a properly proportioned pattern of a necessary size can be first made and this pattern, reduced in a desired ratio, can be used to develop opaque regions on so-called "high contrast" glass. Thereafter, the patterned glass may be used as a mask to expose an underlying formed body through the transparent regions while preventing the formed body under the opaque regions from being exposed. This technique has been used in the formation of patterned articles having exceptional resolution and, in extremely close tolerances, wherein the dimensions are a small fraction of those successfully obtainable by known stamping or etching techniques, or the like.

It will be understood, of course, that photosensitive, or photosensitized, media are well known in the art and that the present inventor only need select a binder such that the binder material remaining after the pattern is developed in the formed body is volatilized off during the firing, or sintering, of the patterned article to unitize it. Thus, one may select from a wide variety of binders such as polyvinyl chloride and other vinyl homo- or heteropolymers; cellulosics; and natural and synthetic colloids such as gelatine, albumin, casein, dextrins, starches, etc. Likewise, where sensitizers are needed, a variety of known sensitizers, appropriate to the binder, may be used especially the mono- and polyazo compounds and the previously mentioned bichromates. Other sensitizers may be used such as amino or carbonyl compounds.

As has been stated, finely divided ceramic materials have heretofore been formulated with temporary resin binders to form a fluid body and cast into unpatterned sheets which, in turn, are cut or stamped into desired articles and thereafter fired to unitize the stamped or cut out articles. The major objectives of this invention, however, cannot be achieved by such a process. The techniques used in such processes in the formulation of the fluid masses and in the casting of the unpatterned body can be used in the process of this invention. Park, U.S. Patent No. 2,966,719, shows such a process for formulating various dielectrics with various termoplastic plasticized resin binders while Levinson, U.S. Patent No. 3,125,618, is primarily concerned with the formulation of dielectric materials with acrylic resin binders. Each of these disclosures places emphasis on drying the cast bodies without the development of pin holes. The same techniques shown in these patents for providing desired particle sizes, for formulating these particles in desired concentrations into castable masses, and for a casting of the formulation masses into formed bodies, as by doctor-blading, and subsequently drying of the formed body without the development of pin holes may be used in the process of this invention. As stated, however, photo-sensitized binders are used in the process of this invention to develop the desired patterned article and a plurality of cast films are often laminated together before the desired pattern of exceptional resolution is developed by photo-forming techniques and the patterned article thereafter unitized by firing.

In laminating the film, it is most advantageous to place surfaces which have been exposed to the atmosphere in juxtaposition with surfaces produced upon a substrate. It is to be observed, also, that under some circumstances a certain amount of at least surface porosity may be desirable in this invention as, for instance, when it is desired to absorb, or take up, a printed circuit, or substance convertible into a conductor, on a dielectric substrate.

It will be realized that certain photo-sensitive liquid binders may be directly hardened or have their solubility altered, by photo-exposure so that the drying steps set out in the patents discussed above may not be necessary in the process of this invention.

Thus, when producing unitary patterned solid bodies from ceramic particlate material the process of this invention typically would involve the following steps:

(1) Ceramic powder of a desired particle size is added to the photo-sensitive binder, stepwise, with steady mixing to reduce the size and number of powder agglomerates.

(2) The sensitizer is added to the ceramic/photo-sensitive binder mix with continued stirring.

(3) The resulting mix is homogenized by 2–3 passes on a 3-roll mill or by ball milling for 18–24 hours. It should be noted that ceramic agglomerates must be eliminated so that each particle is coated by the binder. Uncoated ceramic particles can be worked out during the developing operation to produce voids or pin holes in the ceramic.

(4) The photoresist ceramic (PRC) mix is doctor-bladed onto Mylar or an equivalent film from which the photoresist ceramic film can be separated when dry. Typically, the doctor-blade can be set at .008″ to produce a .006″ thick ceramic film on drying.

(5) The PRC is air and/or heat dried, depending upon the photopolymerization mechanism.

(6) The dried film is exposed to a light source from one or two sides during which time photopolymerization or depolymerization is achieved.

(7) The PRC is developed with an appropriate solvent.

(8) The photoformed ceramic is washed and dried by air and/or heat.

(9) The photoformed, and now patterned, ceramic is stripped from the substrate on which it is formed.

(10) The photoformed ceramics can be laminated by heat and/or pressure.

(11) The laminated (or unlaminated) body is fired in such manner as to decompose and voltatilize off the organic binder and then to sinter the ceramic.

A typical polyvinyl alcohol binder in which the desired pattern would be formed in the exposed region in the process set out above is set out, in parts by weight, in the table below:

| Ingredient: | Parts |
|---|---|
| Polyvinyl alcohol (15% solids) | 40 |
| Zircon alkaline earth porcelain | 55 |
| Plasticizer, wetting agent, water | 5 |
| Ammonium dichromate (12% aqueous solution) | 12 |

Polyvinyl alcohol binders may be sensitized with azo compounds instead of being sensitized with bichromates as set out above.

The foregoing and other objects, features and advantages of the invention will be apparent from the following more particular description of a preferred embodiment thereof, as illustrated in the accompanying drawings.

Figure 1:
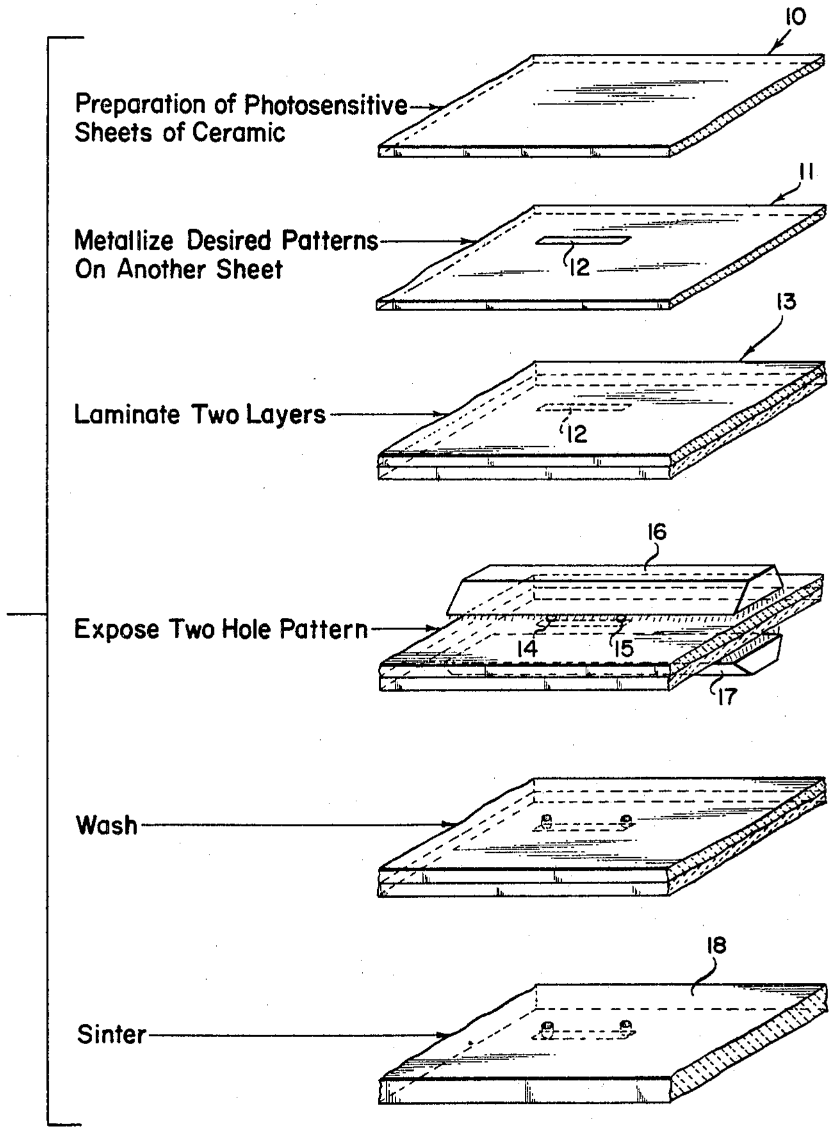
FIGURE 1 is an exploded view of a simplified embodiment of the invention showing how access holes are provided for a buried conductor.

FIGURE 1 is largely self-explanatory. First a "green" sheet of ceramic material 10 is laid down (formed), dried and removed from an appropriate substrate in the manner described above. Sheets having thicknesses varying 1/10 mil to 50 or more mils have been laid down. Next another like sheet 11 is prepared and one or more, metalized paths 12 are laid down on sheet 11. Sheets 10 and 11 are laminated, as set out above, to provide a composite 13 with a buried conductor 12. As shown, the photosensitive binder is rendered insoluble by exposure to light, this composite 13 is shown with opaque dots 14 and 15 exactly determining the bore of a hole to be developed later. Also, sources of light 16 and 17 are shown as exposing the composite from both sides. This would be necessary provided conductor 12 were opaque to the sources of light 16 and 17. After the exposure the pattern is developed by washing the composite 13 with a solvent for the unexposed binder which is not a solvent for the exposed and hardened binder such as the original solvent. In this way, the unexposed binder and the particulate therein, together with the opaque material are washed out leaving holes leading to the buried conductor. It will be apparent the same results could be obtained by exposing the top of the composite through transparent masks provided with appropriately located dots thereon. After the pattern is developed the composite 13 is sintered to drive off the hardened binder and unitize the particulate material thereby providing the desired unitary article 18.

Figure 2:
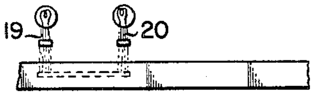
FIGURE 2 is an illustration of an alternative means of providing access holes to the buried conductor shown in FIGURE 1.

FIGURE 2 is essentially the same as FIGURE 1 except that only the region which is to be removed is exposed to light and thereby rendered soluble in a selective solvent which is not a solvent for the original binder. For example, a resin binder can be used in such a process which is depolymerized by exposure to a source of light to which the resin is sensitive such as actinic light. Of course, the exposure may be made by using a beam of light or by using an appropriate screen. As illustrated beams of light 19 and 20 are shown. The film is developed by washing the material out of the exposed region in a known selective solvent for the developed binder material which is not a solvent for the unexposed binder material.

It will be understood FIGURES 1 and 2 are illustrated in overly simplified form in the interest of ease of explanation. Convention electronic componets would have a large number of conductors and would require about twice as many access holes from the surface as conductors as will be apparent from FIGURES 3 and 4 described below.

Figure 3:
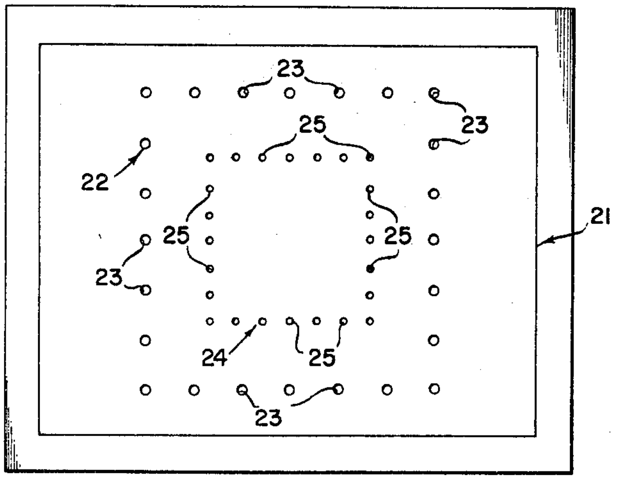
FIGURE 3 is a greatly enlarged perspective representation of a "green" ceramic sheet upon which a pattern of holes has been photoformed.

FIGURE 3 is a greatly enlarged plan, or perspective view of a green sheet 21 actually produced in a manner illustrated in FIGURES 1 and 2. The outer pattern of holes 22 are produced on a 50 mil diameter and the holes 23 have a diameter of about 23 mils. The diameters of the inner pattern 24 and the holes thereof 25 are about half of those in the outer pattern 22. Such sheets with even smaller holes of about one mil in diameter made by the invention have not heretofore been producible when using known procedures.

Figure 4:
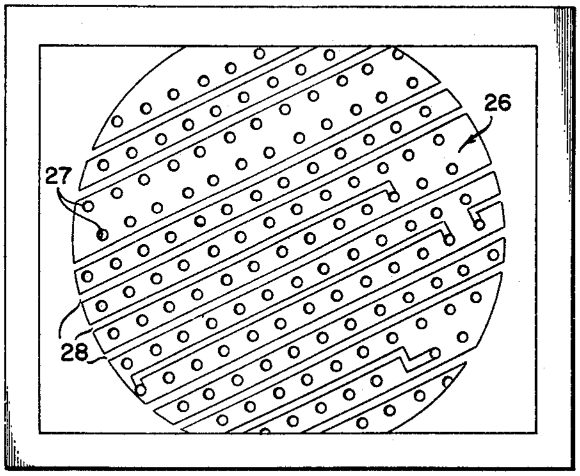
FIGURE 4 is a perspective view of a "green" ceramic sheet similar to the sheet of FIGURE 3 upon which conductors have been laid down.

FIGURE 4 shows a green ceramic sheet 26 having a pattern of holes generally designated 27 with a series of conductors 28 consisting of nickel powders.

It will be apparent a sintered combination of matched, registered laminated and sintered green sheets such as sheets 26 and 21 could be sintered into two, or more, lamina of an electronic component for memory devices and the like and such sheet shave been so unitized for such purposes.

The foregoing discussion makes it obvious that one following the process described herein can produce complex patterned articles with exceptional resolution and with superior tolerances by photo-forming through an appropriate mask or with a directed and controlled beam, or beams, of light. Thus, by binding together ferrites with photo-sensitive binders, sintered and unitized ferrites in desired patterns such as memory cores can be produced. In fact, any fireable particulate materials may be used in the process of this invention which have a firing, or sintering, temperature above the volatilization temperature of the binder remaining after the desired pattern is developed. Likewise, any binder may be used which can be volatilized off, after the pattern is developed, at a temperature below the firing temperature for the particulate material being unitized. These factors lend great flexibility to the instant process.

While the processes of this invention have particularly advantageous application in microminiaturization, it will be realized many of the advantages of this invention can be obtained when fabricating unitized patterned articles from any finely divided particulate material. Also it will be apparent the principles of the invention are applicable regardless of whether the fired particulate material is caused to form a coherent whole with or without melting.

For example, the procedure set out above can be used to produce a patterned metal or alloy from metal particles.

While the invention has been particularly shown and described with reference to certain preferred embodiments thereof, it will be understood by those skilled in the art that various changes in form and details may be made therein without departing from the spirit and scope of the invention.

What is claimed is:

1. A process for making patterned unitary solid bodies from finely divided discrete fireable particles, which comprises forming a fluid mass of said particles by dispersing them in a photo-developable liquid binder medium; forming said mass into a body, selectively photo-exposing a part of said body to provide an exposed and an unexposed region therein of a desired configuration, one of said regions with an insoluble binder constituting the desired pattern, the binder in the other region being soluble, removing the other of said regions and the particulate particles contained therein by washing with a solvent for said soluble binder but not for the insoluble binder to retain the desired pattern in the formed body, and firing the patterned body at a temperature to volatilize off the binder and to sinter the discrete particles to form a unitized patterned article.

2. The process of claim 1, wherein the unexposed region is removed.

3. The process of claim 1, wherein the exposed region is removed.

4. The process of claim 1, wherein the formed body is dried before it is photo-exposed.

5. The process of claim 1, wherein the discrete particles are dielectric ceramic materials.

6. The process of claim 1, wherein the discrete particles are ferro- or ferri-magnetic materials.

7. The process of claim 1, wherein the discrete particles are metal particles.

8. The process of claim 1, wherein the formed body is a thin film.

9. The process of claim 8, wherein a plurality of formed films are laminated.

10. The process of claim 9, wherein a formed film has a configuration laid down thereon before lamination takes place.

11. The process of claim 10, wherein the configuration is an embedded conductor provided with access holes to the surface of the laminated films.

12. A process for making a unitary solid layer in a selected pattern comprising mixing fine sinterable particles of ceramic material with a photo-developable binder medium, said binder medium being removable upon heating to a temperature which is below the sintering temperature of said particles, forming a layer of the mixture, selectively exposing to radiation a region of said mixture in a pattern to sensitize said photo-developable binder medium, developing the sensitized medium to differentiate the exposed region from the unexposed region and to leave the pattern region insoluble and the other region soluble in a solvent, washing of the soluble one of said regions with said solvent to leave the insoluble region having the selected pattern, and firing said remaining region to remove the binder and sinter said particles to form a unitized layer.

13. A process for making unitary solid bodies, comprising forming a plurality of layers of sinterable material in desired patterns, each layer being formed by mixing fine ceramic dielectric particles and a photo-developable binder medium removable at a temperature below the sintering temperature of said particles, forming a layer of said material, exposing said layer in a pattern to sensitize said photo-developable medium in said pattern, developing said medium to produce exposed and unexposed regions of soluble and insoluble materials, washing away the soluble material to retain the insoluble materials forming the pattern, superimposing said layers with conductors between, and heating the stacked layers of material to a temperature to remove said binder and to sinter said particles to form a unitized mass with the conductors embedded therein.

References Cited

UNITED STATES PATENTS

| | | | |
|---|---|---|---|
| 2,966,719 | 1/1961 | Park | 264—66 |
| 3,322,871 | 5/1967 | Noack et al. | 264—104 |
| 3,140,176 | 7/1964 | Hoffman | 96—34 |

J. STEINBERG, Primary Examiner

U.S. Cl. X.R.

96—36.2; 156—3, 8, 17; 264—63